United States Patent
Lu et al.

(10) Patent No.: US 9,911,201 B2
(45) Date of Patent: Mar. 6, 2018

(54) IMAGING PROCESS INITIALIZATION TECHNIQUES

(71) Applicant: Adobe Systems Incorporated, San Jose, CA (US)

(72) Inventors: Xin Lu, Mountain View, CA (US); Zhe Lin, Fremont, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/191,141

(22) Filed: Jun. 23, 2016

(65) Prior Publication Data

US 2017/0372493 A1   Dec. 28, 2017

(51) Int. Cl.
 *G06T 7/40*   (2017.01)
 *G06K 9/20*   (2006.01)
 *G06T 5/00*   (2006.01)

(52) U.S. Cl.
 CPC ............ *G06T 7/408* (2013.01); *G06K 9/2054* (2013.01); *G06T 5/001* (2013.01); *G06T 2207/10024* (2013.01)

(58) Field of Classification Search
 CPC ..................... G06T 7/408; G06T 5/001; G06T 2207/10012; G06T 2207/10024; G06T 2207/20104; G06K 9/6202; G06K 9/2054; G06K 9/4652
 See application file for complete search history.

(56) References Cited

U.S. PATENT DOCUMENTS

| | | |
|---|---|---|
| 4,809,349 A | 2/1989 | Herby et al. |
| 6,370,270 B1 | 4/2002 | Nair et al. |
| 6,721,446 B1 | 4/2004 | Wilensky et al. |
| 7,340,108 B2 | 3/2008 | Florent et al. |
| 7,676,081 B2 | 3/2010 | Blake et al. |
| 7,729,422 B2 | 6/2010 | Wilensky |
| 7,853,099 B2 | 12/2010 | Shinmei et al. |
| 8,331,695 B1 | 12/2012 | Delva |
| 8,564,683 B2 * | 10/2013 | Easwar .................. G06T 9/007 348/222.1 |

(Continued)

OTHER PUBLICATIONS

Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.

(Continued)

*Primary Examiner* — Ali Bayat
(74) *Attorney, Agent, or Firm* — Wolfe-SBMC

(57) ABSTRACT

Imaging process initialization techniques are described. In an implementation, a color estimate is generated for a plurality of pixels within a region of an image. A plurality of pixels outside of the regions are first identified for each pixel of the plurality of pixels within the region. This may include identification of pixels disposed at opposing directions from the pixel being estimated. A color estimate is determined for each of the plurality of pixels based on the identified pixels. As part of this, a weighting may be employed, such as based on a respective distance of each of the pixels outside of the region to the pixel within the region, a distance along the opposing direction for corresponding pixels outside of the region (e.g., at horizontal or vertical directions), and so forth. The color estimate is then used to initialize an imaging process technique.

18 Claims, 12 Drawing Sheets

(56) References Cited

U.S. PATENT DOCUMENTS

| | | | |
|---|---|---|---|
| 8,634,627 B2 | 1/2014 | Fujisawa | |
| 8,698,906 B2 | 4/2014 | Imade | |
| 9,760,978 B1 | 9/2017 | Lu et al. | |
| 2004/0042662 A1 | 3/2004 | Wilensky et al. | |
| 2008/0267526 A1* | 10/2008 | Mitsunaga | H04N 5/35563 |
| | | | 382/274 |
| 2009/0161948 A1 | 6/2009 | Takahashi et al. | |
| 2010/0039556 A1 | 2/2010 | Au et al. | |
| 2012/0281923 A1* | 11/2012 | Irani | G06K 9/6223 |
| | | | 382/218 |
| 2012/0307116 A1* | 12/2012 | Lansel | G06T 3/4053 |
| | | | 348/273 |
| 2012/0320228 A1 | 12/2012 | Imade | |
| 2013/0272602 A1 | 10/2013 | He et al. | |
| 2015/0294182 A1 | 10/2015 | Kenig et al. | |
| 2016/0063685 A1 | 3/2016 | Tuzel et al. | |

OTHER PUBLICATIONS

Chen, "Semantic Image Segmentation with Deep Convolutional Nets and Fully Connected CRFs", International Conference on Learning Representations (ICLR), Apr. 9, 2015, 14 pages.

Long, "Fully Convolutional Networks for Semantic Segmentation", IEEE Conference on Computer Vision and Pattern Recognition (CVPR), Nov. 14, 2014, 10 pages.

Noh, "Learning Deconvolution Network for Semantic Segmentation", International Conference on Computer Vision (ICCV), 2015., May 2015, pp. 1520-1528.

Simonyan, "Very deep convolutional networks for large-scale image recognition", In Journal of Computing Research Repository, Sep. 2014, 14 pages.

"Supplemental Notice of Allowance", U.S. Appl. No. 15/149,415, dated Aug. 16, 2017, 4 pages.

"Notice of Allowance", U.S. Appl. No. 15/149,415, dated May 9, 2017, 7 pages.

* cited by examiner

IMAGING PROCESS INITIALIZATION TECHNIQUES

BACKGROUND

Imaging processes often involve transformation of regions within the image based on "what is contained" in other parts of the image outside of those regions. In one example, the region defines a "hole" in the image that is then filled based on color values of pixels outside of the region in an image processing technique referred to as "hole filling." In another example, the region defines a corrupted portion of the image which is repaired based on other portions of the image in an image processing technique referred to as "image healing." A variety of other examples are also based on similar techniques, such as image restoration and other image editing techniques.

As part of these image editing techniques, pixels within the region are first initialized using color estimates. Processing performed as part of the image editing operation then begins based on these estimated colors. Accordingly, accuracy of these image editing techniques is strongly influenced on the accuracy of the color estimates.

Conventional techniques used to arrive at color estimates rely on a nearest neighbor technique. To do so, a pixel within the region is initialized to a color value based on an adjacent pixel (e.g., nearest neighbor) that is outside of the region. This estimate, however, often fails to support a realistic result. This is typically caused by differences in semantic regions between the pixel being estimated and a pixel that serves as a basis for this estimate. For example, a pixel within the region may in fact represent a dog, but the nearest neighbor pixel outside of the region represents a tree. Because of this, artifacts may be generated within the region based on the conventional techniques which depart from user expectations and realism in the image.

SUMMARY

Imaging process initialization techniques are described. In an implementation, a color estimate is generated for a plurality of pixels within a region of an image. A plurality of pixels outside of the regions are first identified for each pixel of the plurality of pixels within the region. This may include identification of pixels disposed at opposing directions from the pixel being estimated, e.g., horizontal or vertical directions, that are disposed proximal to a border of the region. In another example, the four nearest pixels to the pixel within the region are identified. Other examples are also contemplated.

A color estimate is determined for each of the plurality of pixels based on the identified pixels. As part of this, a weighting may be employed, such as based on a respective distance of each of the pixels outside of the region to the pixel within the region, a distance along the opposing direction for corresponding pixels outside of the region (e.g., at horizontal or vertical directions), and so forth. The color estimate is then used to initialize an imaging process technique, such as hole filing, image healing, and so forth, a result of which is then output for display.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
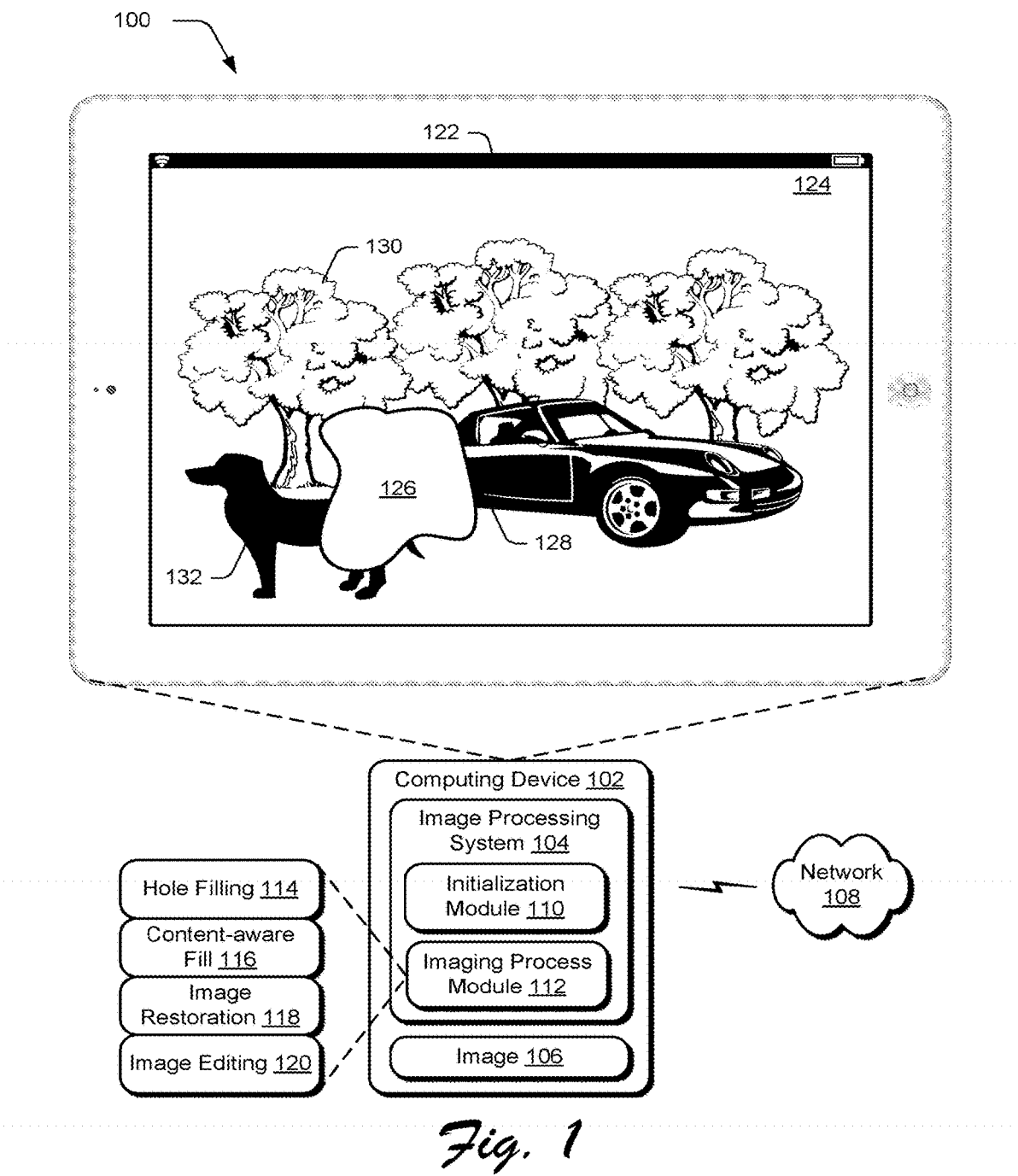
FIG. 1 is an illustration of an environment in an example implementation that is operable to employ initialization techniques described herein.

Imaging processes often involve transformation of regions within the image based on "what is contained" in other parts of the image outside of those regions. To do so, the region within the image is first initialized using color estimates based on pixels of the image "outside" of the region. An example of this is a patch matching technique. The color estimates thus strongly influence a final result of the transformation of the region. Conventional techniques used to generate these estimates, however, are based on a single nearest neighboring pixel, which may fail in situations in which the nearest neighbor has a different semantic type, e.g., relates to a different object than an object that is to be represented by the pixel.

Imaging process initialization techniques and systems are described. In the following, three example initialization techniques are described. Each of these initialization techniques describes how a color value for a pixel in a region (e.g., a "missing" or "corrupted" region of the image) is estimated before processing, such as through use of a patch match technique, deep convolutional neural network training approach, and so forth. This processing may be performed as part of a corresponding imaging process, such as part of content-aware fill, healing, image restoration and other image editing techniques.

In a first example, a Structured Initialization (SI) technique is described as part of imaging process initialization. In this example, a plurality of pixels that are disposed outside of the region are used to generate color estimates for pixels within the image. In one instance, the proposed structured initialization approach averages a plurality of pixels (e.g., the four closest) outside the region to generate a color value as an estimate of the pixel inside the region. This may also include a directional approach in which pixels outside of the region are identified that lie at opposing directions from a pixel being estimated. The pixels disposed at these directions (e.g., vertical, horizontal, diagonal, and so on) are then used as a basis for generating the color estimate for the pixel within the region. Further discussion of the example is described in relation to FIG. 3 in the following sections.

In a second example, a Weighted Structured Initialization (WSI) technique is described as part of imaging process initialization. In this example, pixels outside of the region may be identified in a variety of ways, such as through use of the structured initialization technique described above or any other technique. As part of determining a color estimate for the pixel within the region, a weighting is employed. The weighting in this example is based on a distance between the pixel within the region and corresponding pixels outside of the region. In this way, greater distances are given lesser weights to adjust a contribution of these pixels as part of the determination of the color estimate. Further discussion of the example is described in relation to FIG. 4 in the following sections.

In a third example, a Two-Direction Weighted Structured Initialization (TWSI) technique is described as part of imaging process initialization. As above, pixels outside of the region may be identified in a variety of ways, such as through use of the structured initialization technique described above or any other technique. As part of determining a color estimate for the pixel within the region, a weighting is also employed. The weighting in this example is based on a distance between pixels disposed outside the region at opposing directions, e.g., vertically, horizontally, and so forth. In other words, the distance along the opposing directions is considered as a whole to apply a weighting to pixels disposed at those opposing directions. Accordingly, pixels disposed at closer distances at opposing directions are given greater weight that pixels at other opposing directions that are further away from each other. Further discussion of the example is described in relation to FIG. 5 in the following sections.

In the following discussion, an example environment is first described that may employ the initialization techniques described herein. As part of this description, an example procedure is described which may be performed in the example environment as well as other environments. Consequently, performance of the example procedure is not limited to the example environment and the example environment is not limited to performance of the example procedure.

Example Environment

FIG. 1 is an illustration of an environment 100 in an example implementation that is operable to employ initialization techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud".

The computing device 102 is illustrated as including an image processing system 104. The image processing system 104 is implemented at least partially in hardware of the computing device 102 to process and transform an image 106. Such processing includes creation of the image 106, modification of the image 106, and rendering of the image 106 for output. Although illustrated as implemented locally at the computing device 102, functionality of the image processing system 104 may also be implemented as whole or part via functionality available via the network 108, such as part of a web service or "in the cloud" as further described in relation to FIG. 12.

An example of functionality incorporated by the image processing system 104 to process the image 106 is illustrated as an initialization module 110 and an imaging process module 112. The initialization module 110 is implemented at least partially in hardware of the computing device 102 to generate a color estimate for pixels within a region of an image. The imaging process module 112 is implemented at least partially in hardware of the computing device 102 to employ the color estimate for the pixels to initialize an imaging process. Illustrated examples of imaging processes include hole filling 114, content-aware fill 116, image restoration 118, and image editing 120. Other examples of imaging processes are also contemplated without departing from the spirit and scope of the description contained herein.

The computing device 102 includes a display device 122 that is illustrated as outputting a display of a user interface 124 having the image 106. This image 106 includes a region 126 that is to be transformed as part of an imaging process. For example, the region 126 may include a hole (e.g., resulting from object removal), include corrupted pixels, have an error that is to be "healed," is to be edited, or transformed using any other imaging process.

To begin the imaging process, the initialization module 110 is employed to generate color estimates for pixels within the region 126. As previously described, imaging processes rely heavily on initialization to achieve accurate results. For a patch matching technique, for instance, accurate color estimates improve accuracy in computing a nearest-neighbor field. In another instance, accurate initialization facilitates parameter learning in convolutional layers as part of a deep convolutional neural network.

Generation of these estimates may be challenging, however, especially for regions 216 that are bordered by objects having different semantic types. Region 126, for instance, is bordered by a car 126, tree 130, and dog 132. In a conventional approach, each pixel within the region is initialized based on a single nearest pixel outside of the region. Accordingly, this conventional approach may cause discrepancies when the nearest pixel has a different semantic type than a pixel being "filled in," e.g., actually relates to the car 128 and not the tree 130 or dog 132.

The initialization module 110, however, is configured to address this challenge through use of a variety of different initialization techniques. Examples of these initialization techniques include structured initialization (SI), weighted structured initialization (WSI), and two-direction weighted structured initialization (TWSI). Each of these initialization techniques in the following describe how a color estimate for pixels within the region 126 is determined. The color estimates are then used by the imaging process module 112 as part of a respective imaging process, which may include an underlying patch matching technique, deep convolutional neural network training approach, and so forth.

Figure 2:
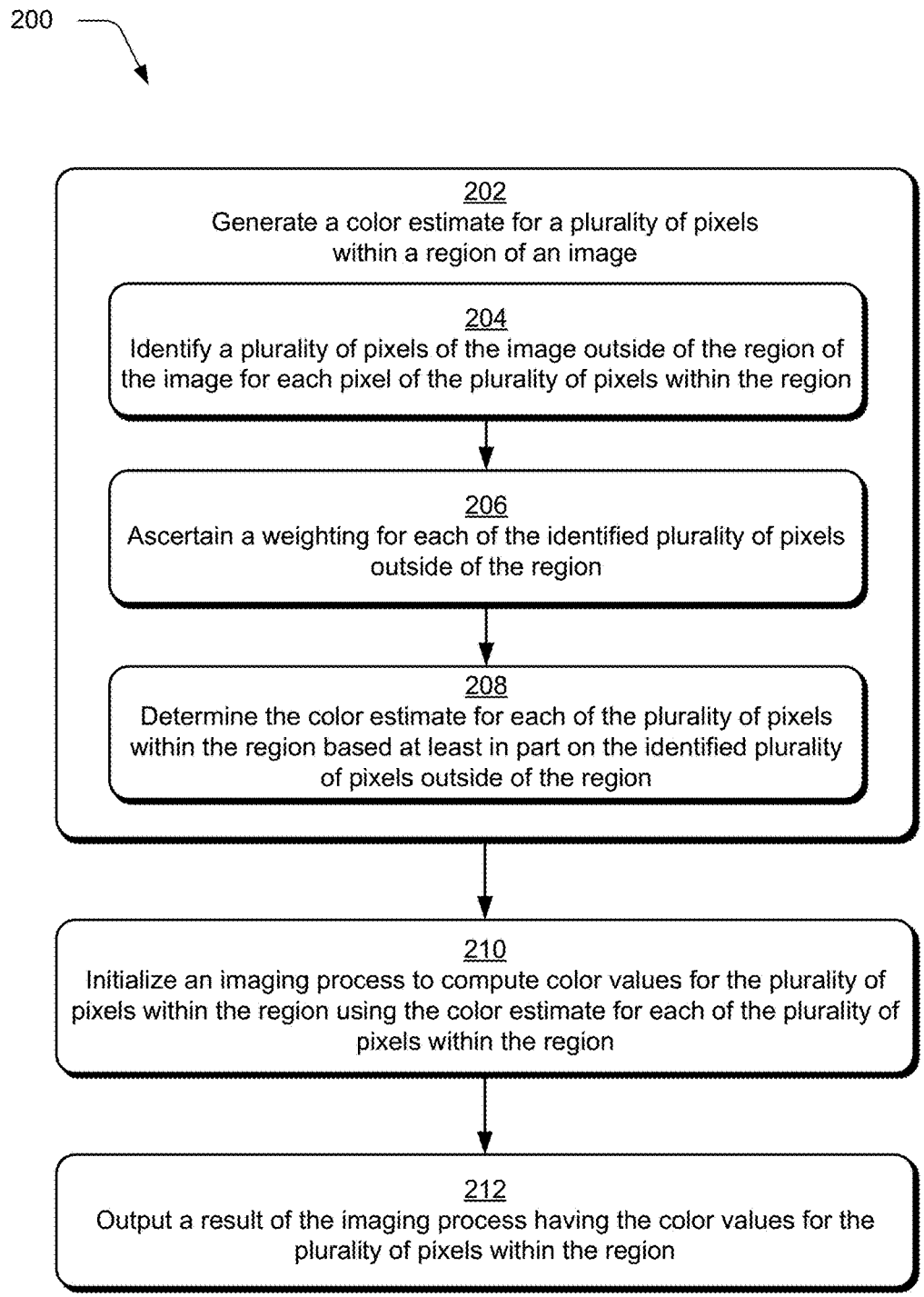
FIG. 2 is a flow diagram depicting a procedure in an example implementation of an imaging process initialization technique.

FIG. 2 depicts a procedure 200 in an example implementation of an imaging process initialization technique. The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

A color estimate is generated for a plurality of pixels within a region of an image (block 202). As previously described, the color estimate is then used to initialize an imaging processing to compute color values for the plurality of pixels within the region using the color estimate for each of the plurality of pixels within the region (block 210), such as through use of a patch matching technique to compute a nearest neighbor field. A result of the imaging process is output having the color values for the plurality of pixels within the region (block 212), such as for display by a display device, physically printed to a tangible medium, and so forth. Thus, the color estimate provides a "starting point" for a subsequent imaging process.

The region, for instance, may be manually specified by a user (e.g., to identify a corrupted area of the image), result from another image processing technique (e.g., object removal), and so forth. A plurality of pixels is identified of the image that are outside of the region of the image for each pixel of the plurality of pixels within the region (block 204). This identification may be performed in a variety of ways, an example of which follows.

Figure 3:
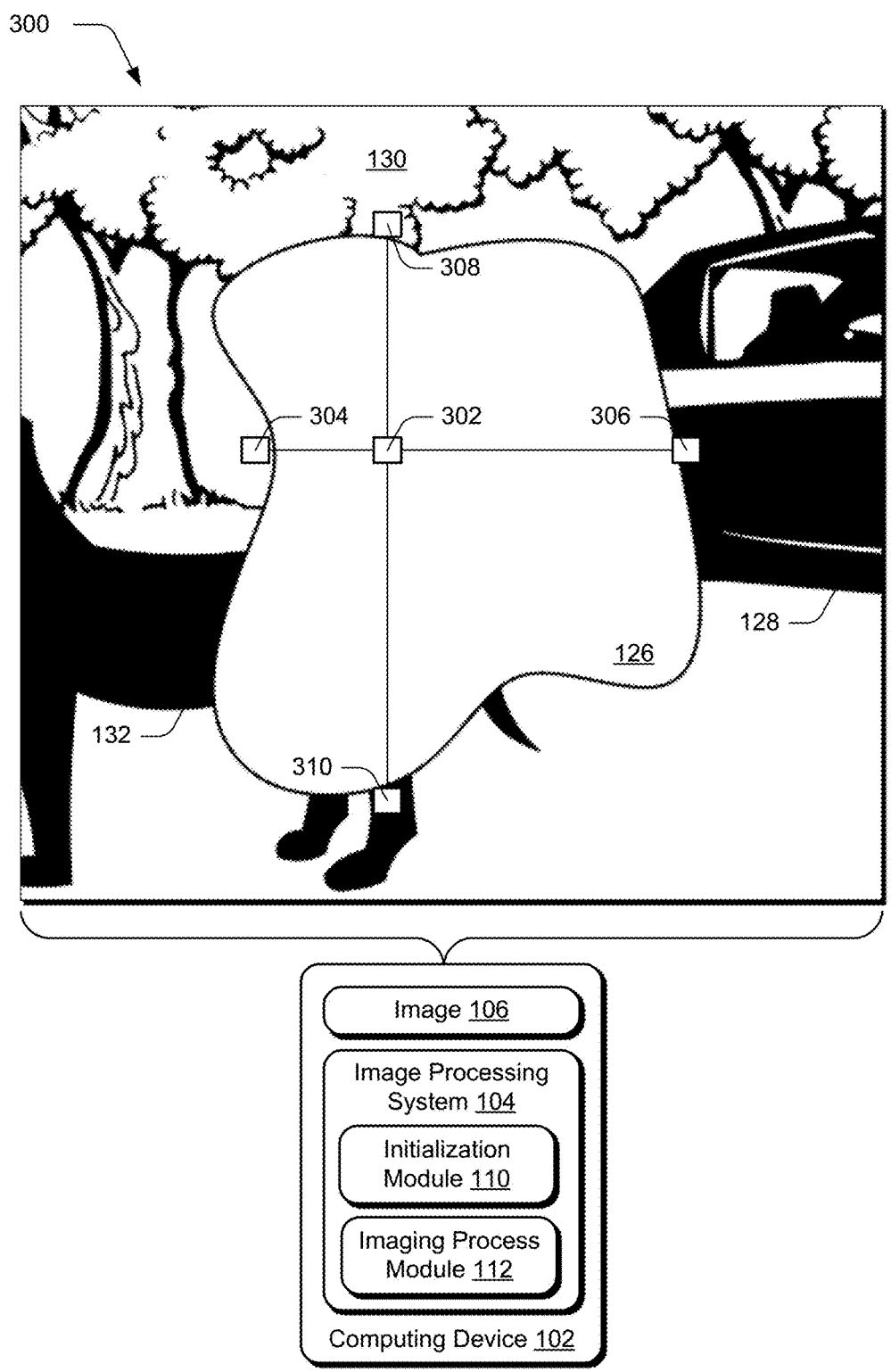
FIG. 3 depicts a system in an example implementation in which an initialization module of FIG. 1 employs a structured initialization technique to identify pixels that are used to estimate color for pixels within a region of an image.

FIG. 3 depicts a system 300 in an example implementation in which the initialization module 110 of FIG. 1 employs a structured initialization technique to identify pixels that are used to estimate color for pixels within a region 126 of the image 106. As previously described, conventional techniques that involve padding each pixel in the region with the nearest pixel value may fail in many situations. This is because the nearest pixel value and the pixel in the region may not be associated with the same semantic region although are the closest pixels in terms of distance.

Accordingly, in this example the initialization module 110 employs a structured approach to identify pixels outside of the region 126 to serve as a basis for a color estimate. For pixel 302, for instance, the initialization module 110 is illustrated as identifying pixels 304, 306, 308, 310 that are closest to the pixel 302 outside of the region at opposing directions from the pixel 302 within the region 126. Pixels 304, 306, for instance, are the pixels that are closest to pixel 302 at opposing horizontal directions that are outside of the region 126. Likewise, pixels 308, 310 are the closest to pixel 302 at opposing vertical directions that are outside of the region 126. In this example, color values for pixels 304, 306, 308, 310 are averaged to generate a color estimate for pixel 302, which is then used to initialize the imaging process of the imaging process module 112.

Expressed mathematically, pixel 302 "P" is a pixel inside the region 126, and pixels 304, 306, 308, 310 "$H_1$," "$H_2$," "$V_1$," "$V_2$," are the four nearest pixels of "P" outside the region 126 at opposing horizontal and vertical directions. For each pixel 302 "P" in the region 126, the color estimate is computed as follows:

$$P=\tfrac{1}{4}(V_1+V_2\pm H_1+H_2)$$

Thus, in this example a simple average is computed. Other examples are also contemplated that incorporate a weighting as further described below.

In one or more implementations, this technique is expanded such that groups of pixels at the opposing directions are employed instead of single instances of pixels, e.g., a group of pixels around pixel 308 instead of just pixel 308. Continuing with the previous example, four groups of nearest pixels, i.e., pixels around "V1," "V2," "H1" and "H2" are first identified. A number of members in the groups, for instance, may be predefined (e.g., a set number) or defined dynamically based on a distribution of color values within the group. For example, an initial grouping showing a high degree of variance in color values may be expanded automatically to determine whether this variance "holds true" (i.e., is accurately reflected) in a larger grouping. Accordingly, in this dynamic example sizes of the groupings may vary, e.g., are different at opposing directions.

Color values are then averaged for each group, which are then used to determine the color estimate for pixel 302. This technique helps to alleviate the randomness produced through use of single pixel instances. According, this grouping technique may also be used in the instances described in the following such that the pixel outside of the region and pixels disposed proximal to that pixel are identified and used to determine the color estimate for the pixel 302. Other structured examples are also contemplated, such as to select a plurality of "closest" pixels regardless of direction.

Returning again to FIG. 2, weightings may also be incorporated as part of a determination of a color estimate. For example, the plurality of pixels may be identified using the structure initialization technique described above or any other technique. A weighting is the ascertained for each of the identified plurality of pixels outside of the region (block 206) which is then used as part of a determination of the color estimate for the pixels within the region (block 208). This weighting may be determined in a variety of ways. In one example, the weighting is based on a distance between pixels inside and outside the region as further described in relation to FIG. 4. In another example, distances between pixels disposed at opposing directions are used to define the weighting as further described in relation to FIG. 5.

Figure 4:
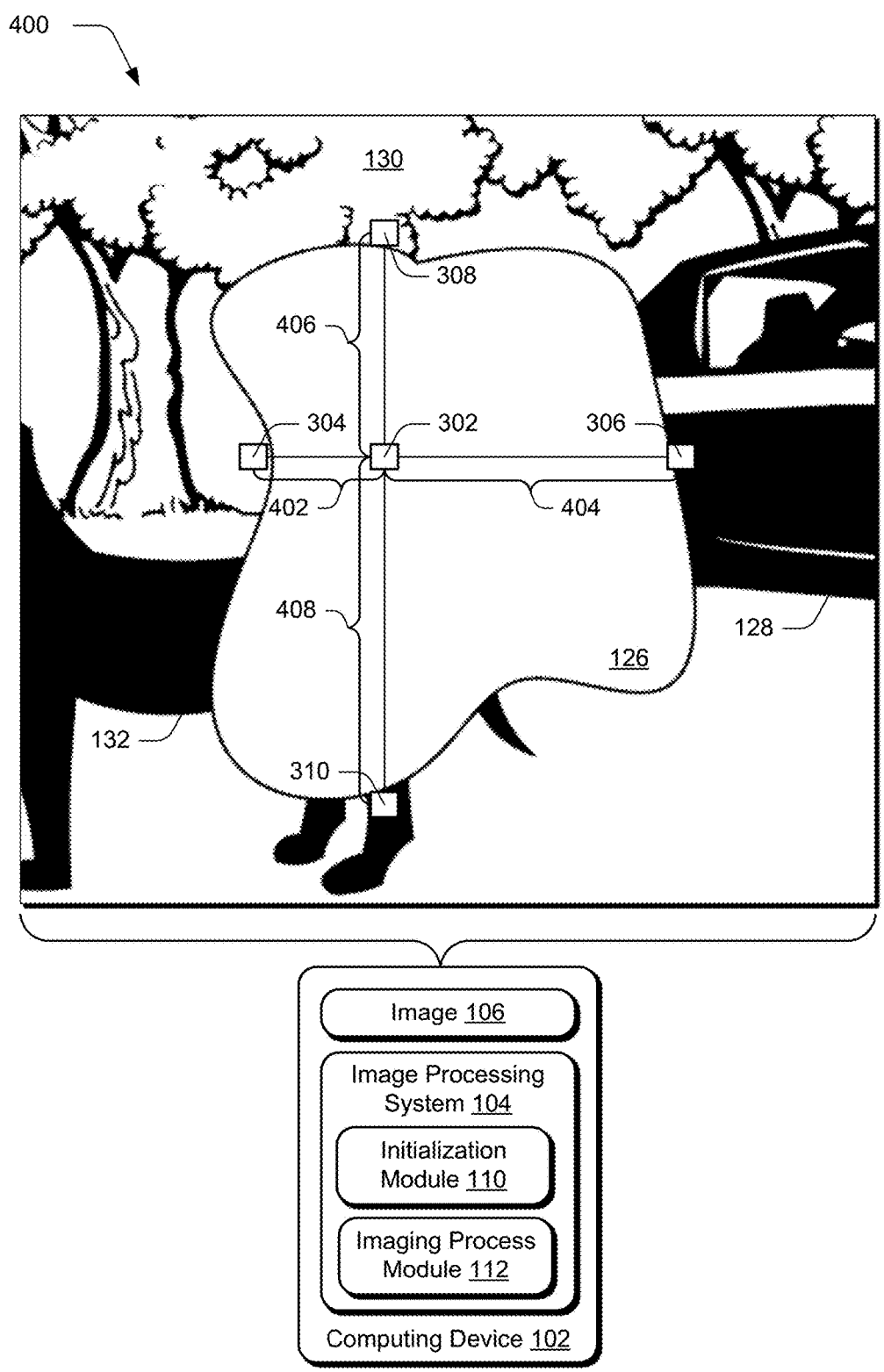
FIG. 4 depicts a system in an example implementation in which an initialization module of FIG. 1 employs a weighted structured initialization technique to identify pixels that are used to estimate color for pixels within a region of an image.

FIG. 4 depicts a system 400 in an example implementation in which the initialization module 110 of FIG. 1 employs a weighted structured initialization technique to identify pixels that are used to estimate color for pixels within a region of an image. The illustrated pixels 304, 306, 308, 310 are identified using the structured initialization approach as previously described in relation to FIG. 3, although any other identification techniques may also be used. A weighting is then calculated by the initialization module 110 such that lesser distances are given greater weight in determination of the color estimate for the pixel 302 than greater distances.

In this example, the distances are defined between the pixels 304, 306, 308, 310 outside the region 126 to the pixel 302 within the region 126. Pixel 304, for instance, is disposed at distance 402 from pixel 302. Likewise, pixel 306 is disposed at distance 404 from pixel 302, pixel 308 is disposed at distance 406 from pixel 302, and pixel 310 is disposed at distance 408 from pixel 302. These distances 402, 404, 406, 408 are then used to define proportions of a contribution of each respective pixel (or group of pixels as above) toward a color estimate for pixel 302. In this way, individual distances of the pixels outside of the region 126 to the pixel for which the color is being estimated is used as the weight.

Expressed mathematically, the weighted structured initialization is built upon the structured initialization by introducing weights. The weights define the contribution made by each of the pixels 304, 306, 308, 310 to a color estimate for pixel 302. For each pixel "P" in the region 126, the color estimate (i.e., the color value of an estimate for a color value of pixel 302) is computed as follows:

$$P = w_1 V_1 + w_2 V_2 + w_3 H_1 + w_4 H_2$$

where $$w_1 = \frac{b}{a+b+c+d}, w_2 = \frac{a}{a+b+c+d},$$
$$w_3 = \frac{c}{a+b+c+d}, w_4 = \frac{d}{a+b+c+d}$$

and $$\Sigma_{i=1}^{4} \omega_i = 1$$

Figure 5:
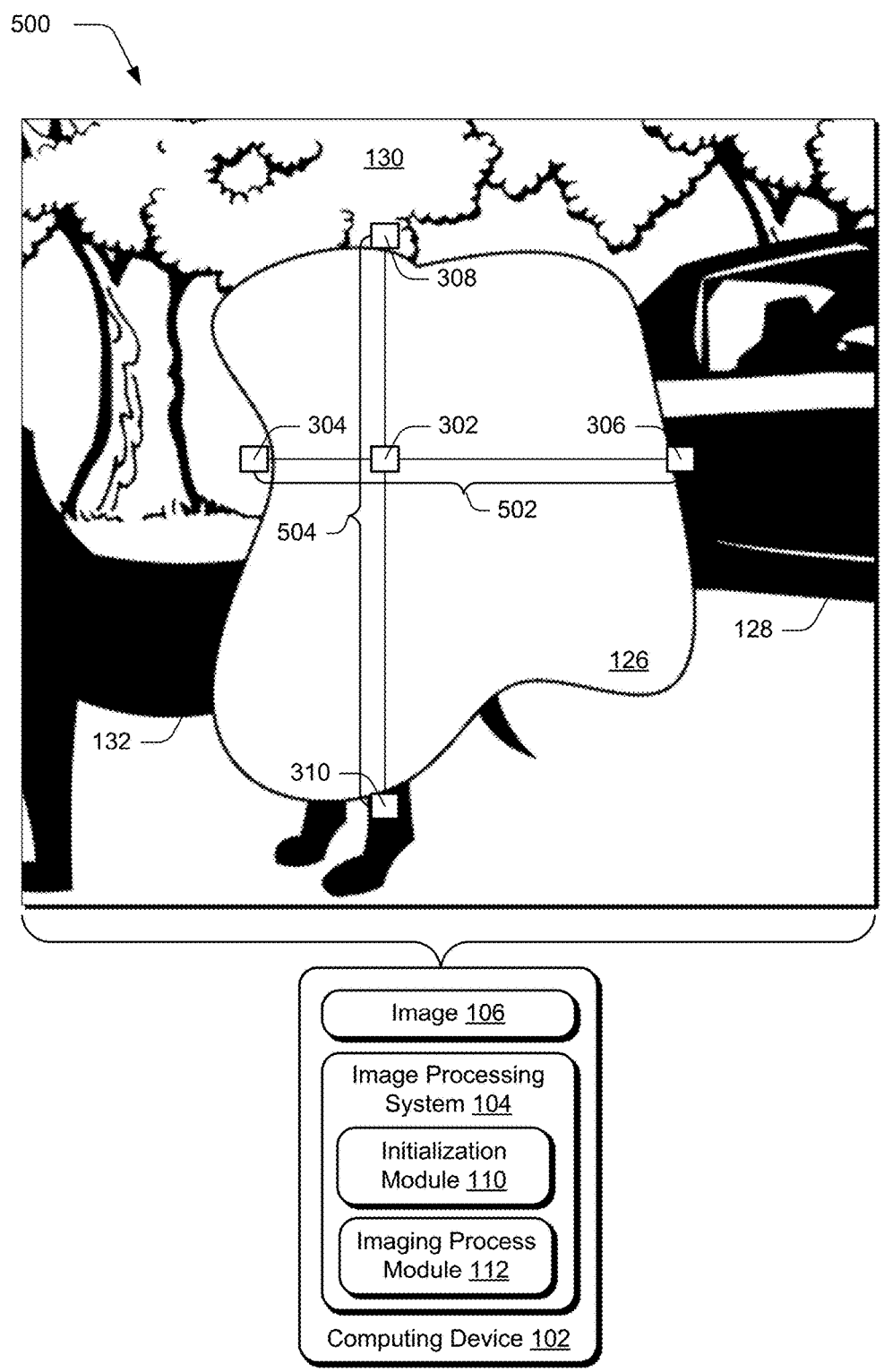
FIG. 5 depicts a system in an example implementation in which an initialization module of FIG. 1 employs a two-direction weighted structured initialization technique to identify pixels that are used to estimate color for pixels within a region of an image.

Thus, this example leverages an assumption that closer pixels have a greater likelihood of being relevant to a color estimate for the pixel 302. Another example of distance-based weighting is described in the following FIG. 5 depicts a system 500 in an example implementation in which the initialization module 110 of FIG. 1 employs a two-direction weighted structured initialization technique to identify pixels that are used to estimate color for pixels within a region of an image. This example may also build upon the previous examples, such as to incorporate the identification of FIG. 3 and the weighting of FIG. 4.

The weighting in this example is also configured to incorporate a directional weighting based on distances between pixels outside of the region 126. For example, pixels 304, 306 are disposed in opposing directions horizontally in the image 106. A distance 502 is calculated between these pixels 304, 306 by the initialization module 110. Likewise, pixels 308, 310 are disposed in opposing directions vertically in the image 106 and a distance 504 is calculated between them by the initialization module 110. A weighting is then ascertained by the initialization module 110 by leveraging a likelihood that opposing pixels 304, 306 that are closer to the pixel 302 are more likely to accurately reflect a color of the pixel 302 than pixels 308, 310 at relatively greater distances.

Thus, the two-direction weighted structured initialization described herein is built upon the weighted structured initialization approach. This is performed by introducing weights to tell the overall contribution made by the pixels along opposing directions of pixels (e.g., horizontal, vertical, or diagonal lines) that lie outside the region 126. For each pixel "P" in the region 126, the color estimate is computed as follows:

$$P = w_v w_1 V_1 + w_v w_2 V_2 + w_h w_3 H_1 + w_h w_4 H_2$$

where "$w_v$" denotes the weight for "$V_1$" and "$V_2$", and "$w_h$" denotes the weight for "$H_1$" and "$H_2$." The weights may be normalized, e.g., "$w_v w_1 + w_v w_2 + w_h w_3 + w_h w_4 = 1$." The weights of "$w_v$" and "$w_h$" are computed as follows:

$$w_v = \frac{|H_1 - H_2|}{|V_1 - V_2| + |H_1 - H_2| + \epsilon}$$
$$w_h = \frac{|V_1 - V_2|}{|V_1 - V_2| + |H_1 - H_2| + \epsilon}.$$

Accordingly, in this example, if the difference between two outside pixels along a vertical line is smaller than the difference between the two pixels along a horizontal line, then the weight is larger for the two pixels along the vertical line. For color images, the difference between two pixels is a summation of the difference in three channels.

Figure 6:
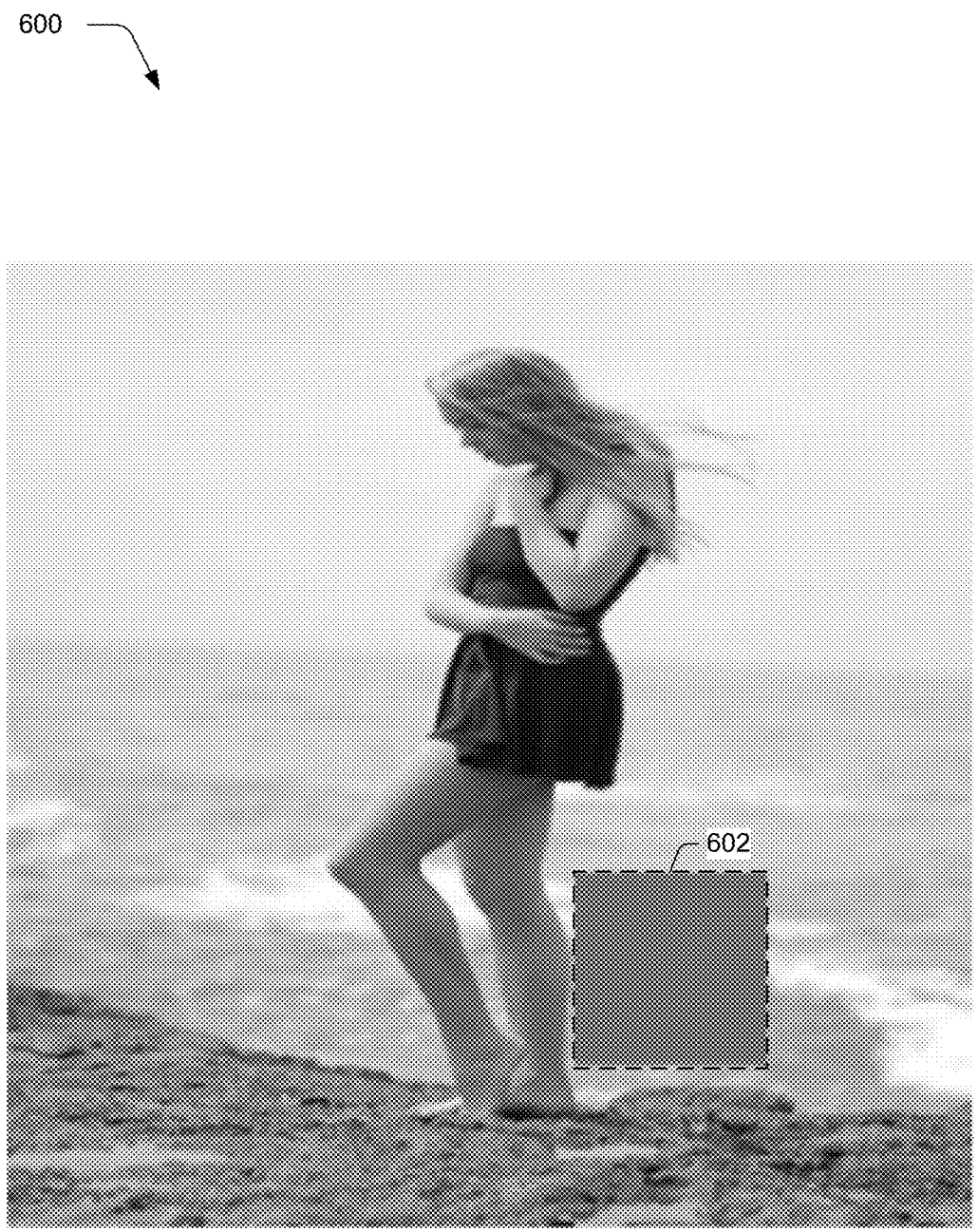
FIGS. 6-11 depict example results of initialization on image processing using the techniques described herein and as contrasted with a conventional result.
Figure 7:
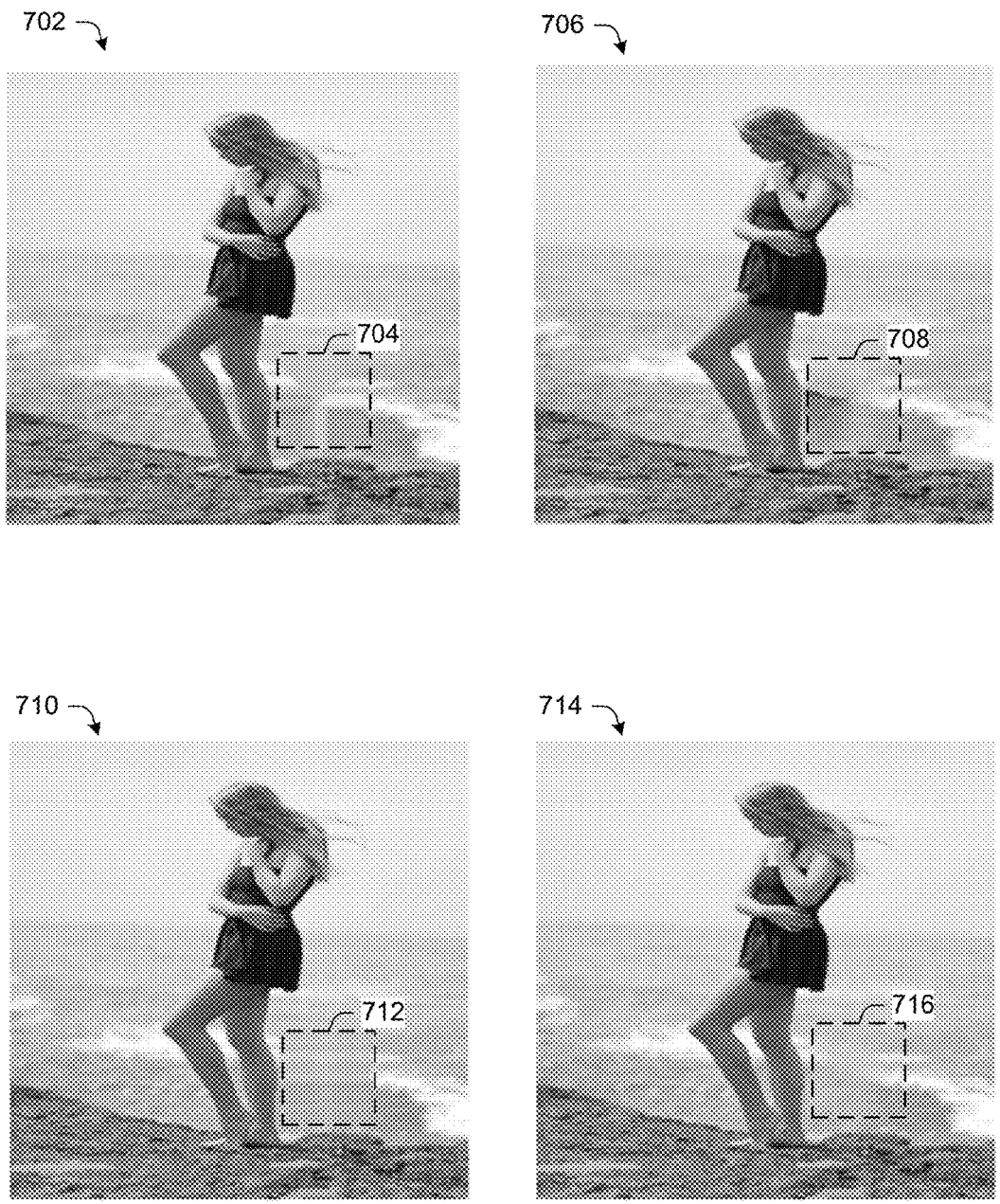
Figure 8:
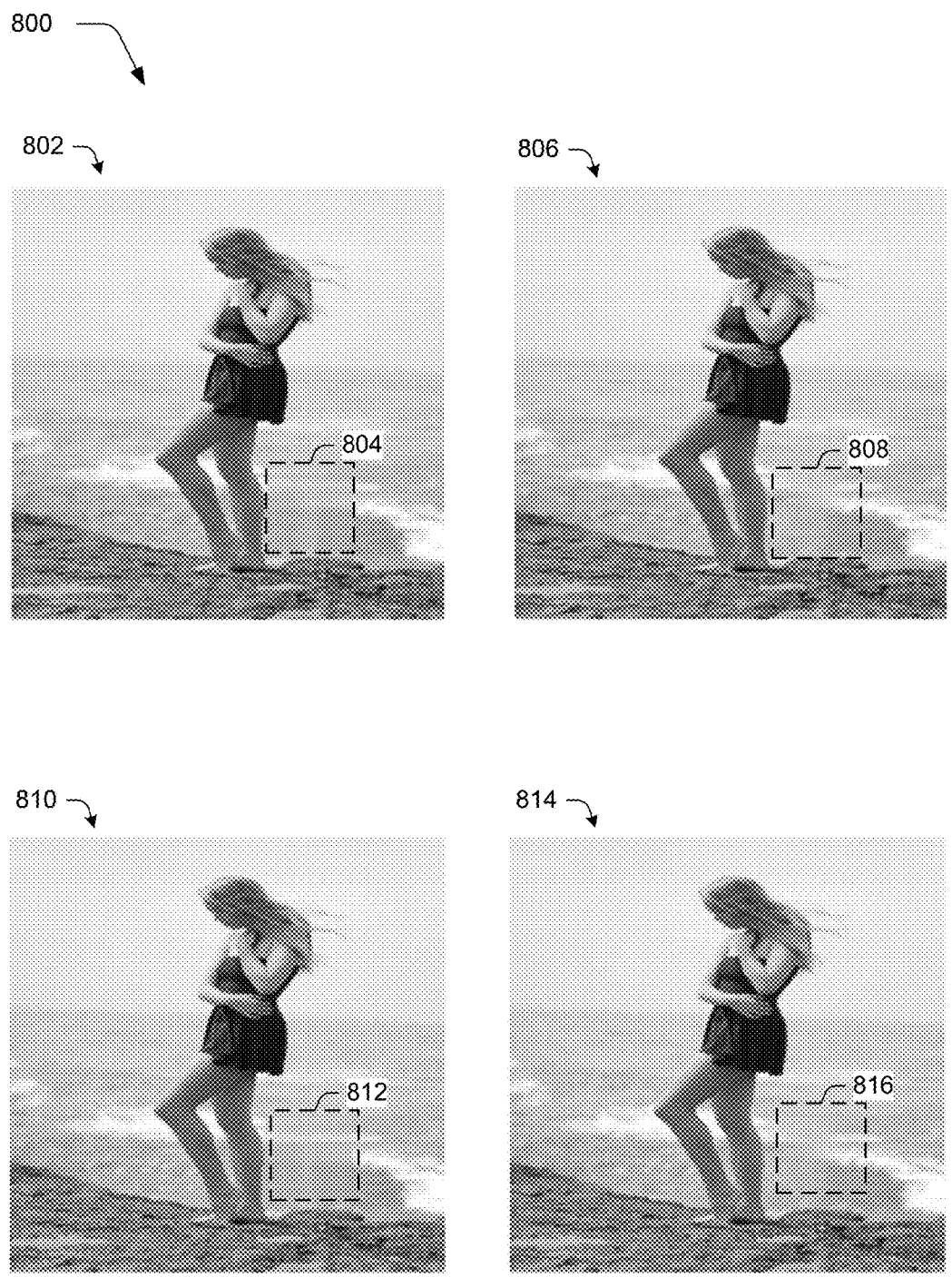

FIGS. 6-11 depict example results of initialization on image processing using the techniques described herein and as contrasted with a conventional result. FIG. 6 shows an image 600 having a missing region 602. In FIG. 7, an image 702 includes a conventional color estimate initialization 704 which is then used as part of a conventional content-aware fill imaging process. This results in image 706 having pixels 708 of the missing region 602 that are "filled in." In this example, this conventional approach results in portion of the beach being used to fill in the region, a majority of which is surrounded by water.

Image 710, however, include a color estimate initialization 712 formed using the structured initialization technique of FIG. 3 by the initialization module 110. An imaging process is then performed by the imaging process module 112 (e.g., content-aware fill) to process the image 714 and fill 716 the missing region 602. As is readily apparent through comparison with the conventional result, the fill 716 is both realistic and intuitive.

Likewise, image 802 includes a color estimate initialization 804, this time formed using the weighted structured initialization technique of FIG. 4 by the initialization module 110. An imaging process is then performed by the imaging process module 112 (e.g., content-aware fill) to generate image 806 in which the missing region 602 is filled 808. Again, as is readily apparent through comparison with the conventional result, the fill 808 is both realistic and intuitive.

Similarly, image 810 includes a color estimate initialization 812, this time formed using two direction weighted structured initialization technique of FIG. 5 by the initialization module 110. An imaging process is then performed by the imaging process module 112 (e.g., content-aware fill) to generate image 814 in which the missing region 602 is filled 816. Yet again, as is readily apparent through comparison with the conventional result, the fill 816 is both realistic and intuitive.

Figure 9:
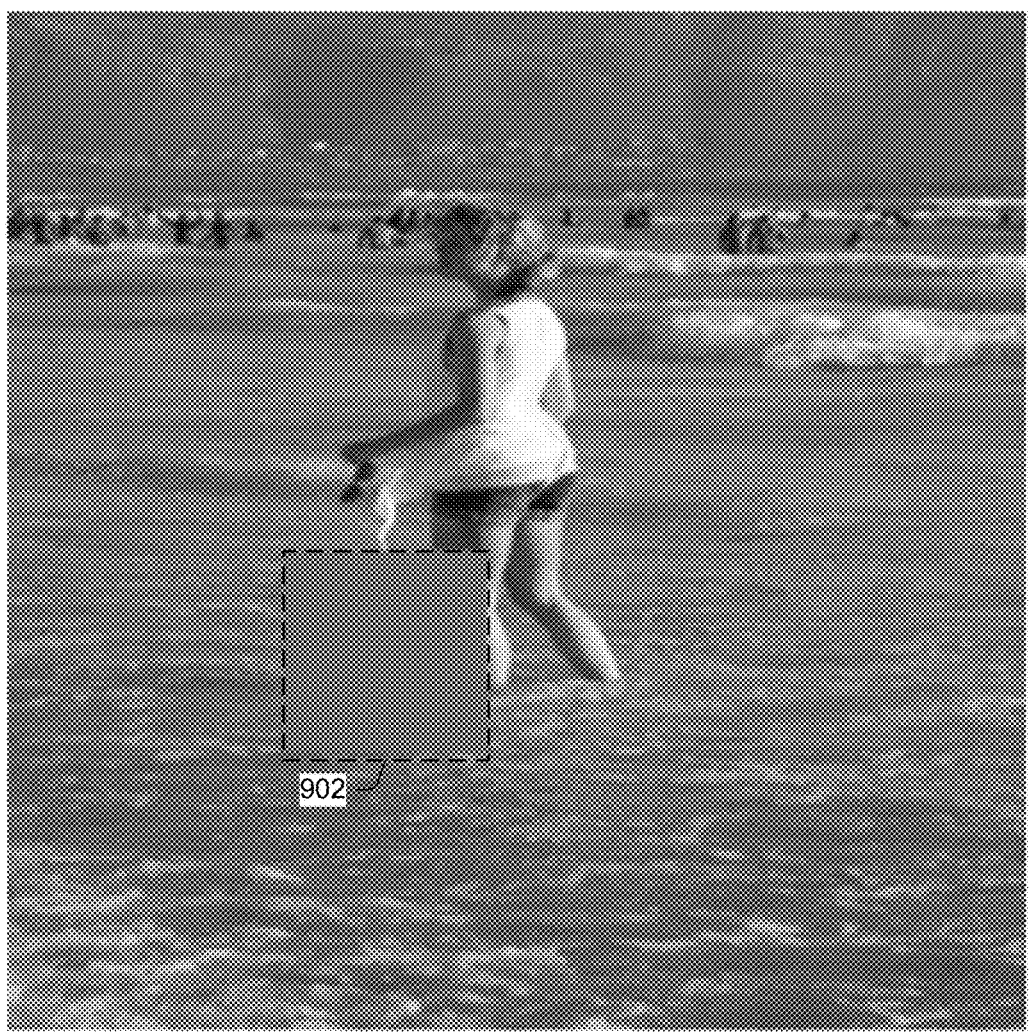
Figure 10:
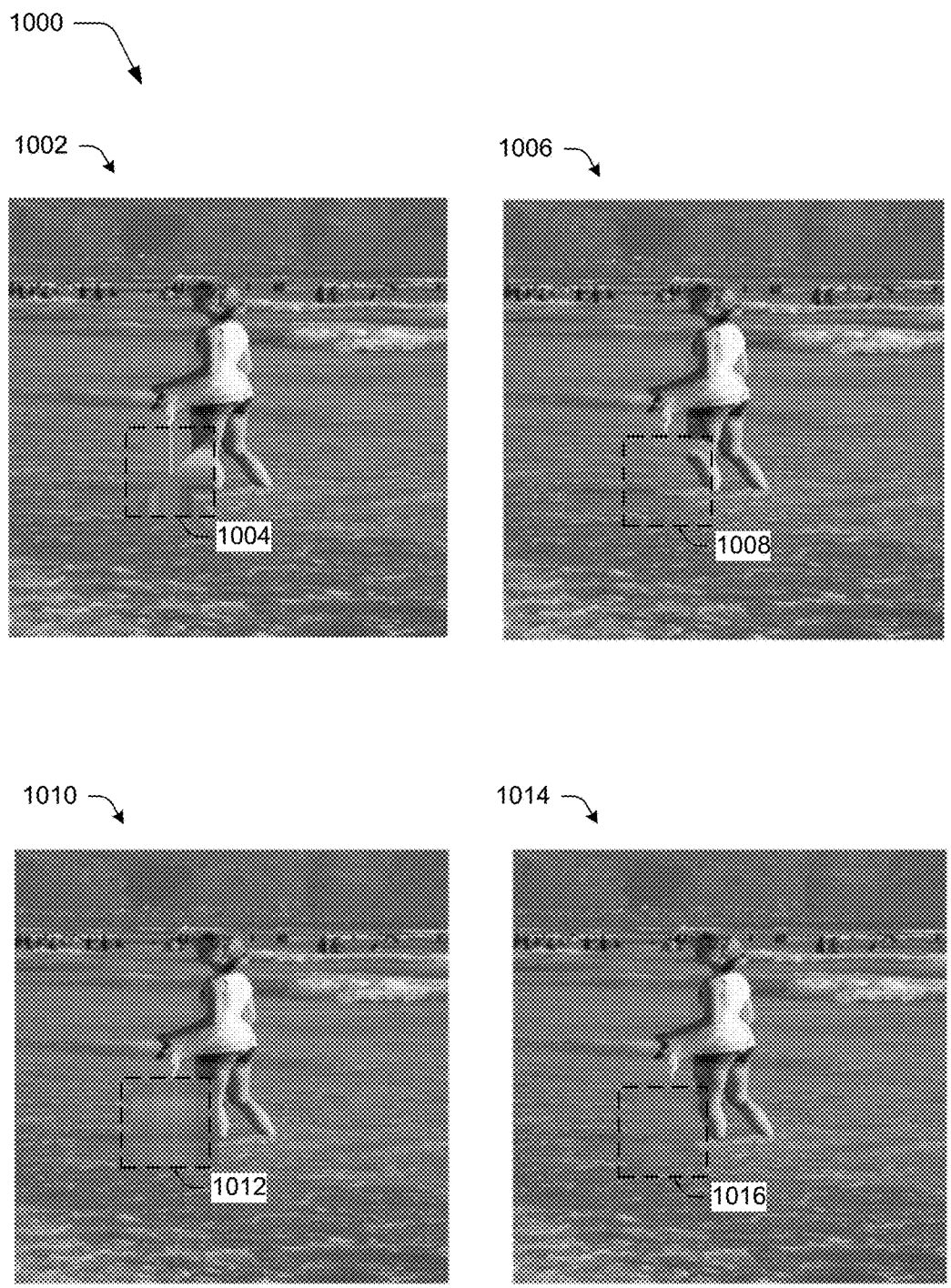

FIG. 9 shows an image 900 having a missing region 902, this time which includes both water and a portion of a person's leg. In FIG. 10, an image 1002 includes a conventional color estimate initialization 1004 which is then used as part of a conventional content-aware fill imaging process that results in image 1006 having pixels 1008 of the missing region 602 that are "filled in." In this example, this conventional approach results in gaps of the user's leg, which is disjointed and visually confusing.

Image 1010, however, include a color estimate initialization 1012 formed using the structured initialization technique of FIG. 3 by the initialization module 110. An imaging process is then performed by the imaging process module 112 (e.g., content-aware fill) to process the image 1014 and fill 1016 the missing region 602. As is readily apparent through comparison with the conventional result, the fill 1016 is both realistic and intuitive and does not include gaps in the person's leg.

Figure 11:
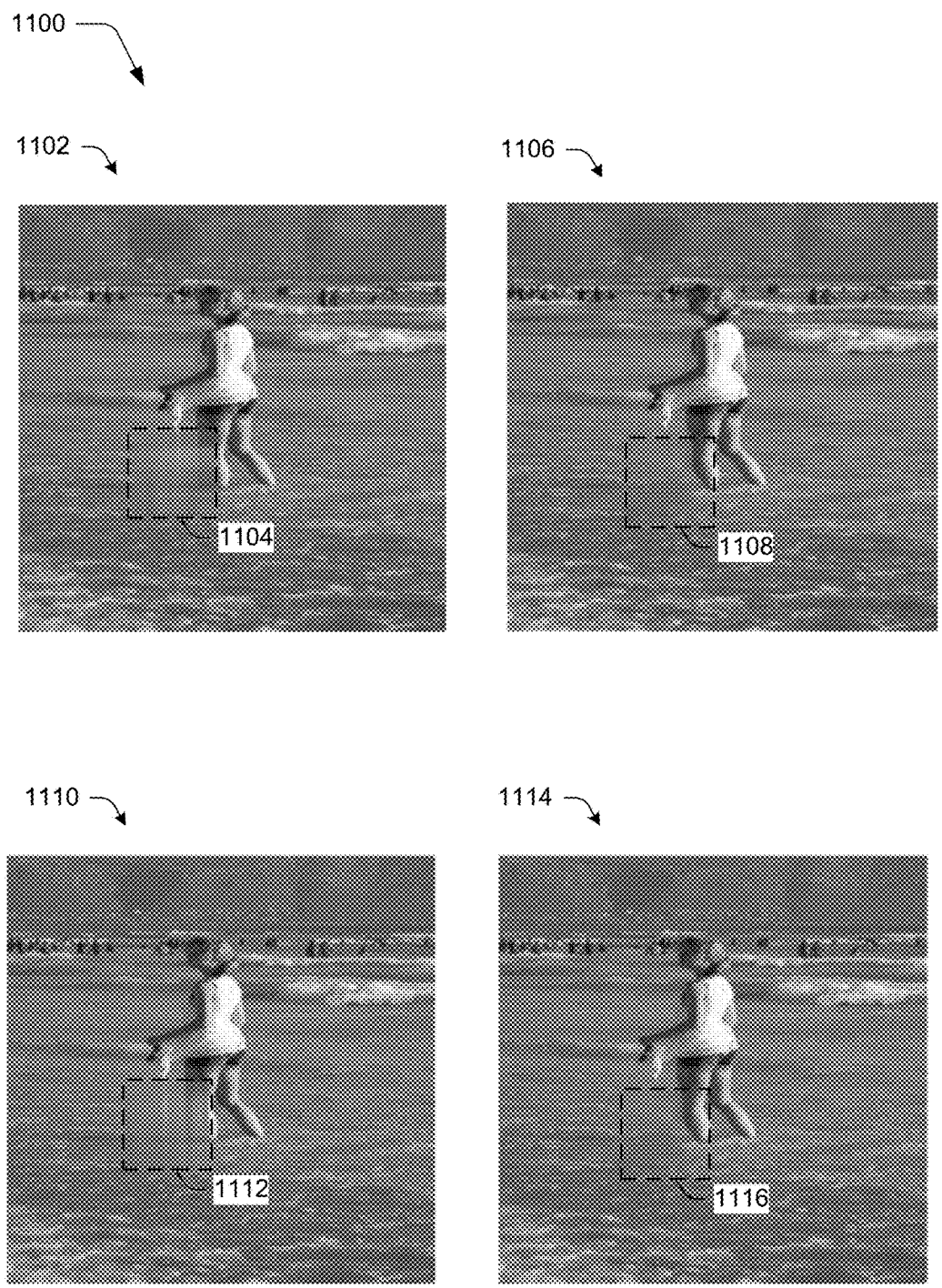

Likewise, as shown in FIG. 11, image 1102 includes a color estimate initialization 1104, this time formed using the weighted structured initialization technique of FIG. 4 by the initialization module 110. An imaging process is then performed by the imaging process module 112 (e.g., content-aware fill) to generate image 1106 in which the missing region 602 is filled 1108. As is readily apparent through comparison with the conventional result, the fill 1108 is both realistic and intuitive.

Similarly, image 1110 includes a color estimate initialization 1112, this time formed using two direction weighted structured initialization technique of FIG. 5 by the initialization module 110. An imaging process is then performed by the imaging process module 112 (e.g., content-aware fill) to generate image 1114 in which the missing region 602 is filled 1116. Yet again, as is readily apparent through comparison with the conventional result, the fill 1116 is both realistic and intuitive.

Example System and Device

Figure 12:
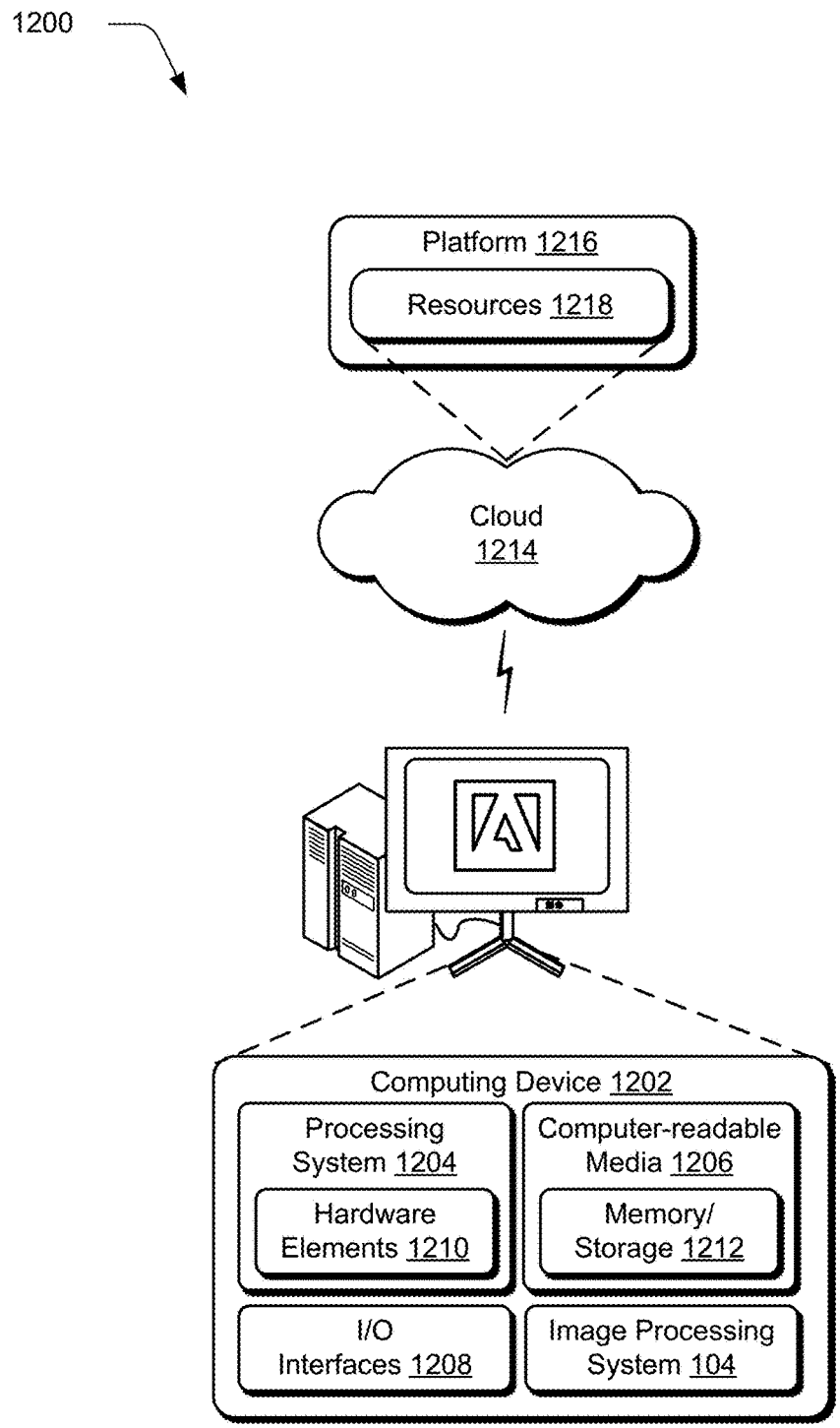
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the image processing system 104 of FIG. 1. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising;
    generating, by the at least one computing device, a color estimate for a plurality of pixels within a region of an image, the generating including:
        identifying a plurality of pixels of the image outside of the region of the image for each pixel of the plurality of pixels within the region, in which at least two of the identified plurality of pixels are identified based on disposition at opposing directions, one to another, from the pixel within the region; and
        determining the color estimate for each of the plurality of pixels within the region based at least in part on the identified plurality of pixels outside of the region;
    initializing, by the at least one computing device, an imaging process to compute color values for the plurality of pixels within the region using the color estimate for each of the plurality of pixels within the region, wherein the imaging process is configured to perform at least one of hole filling, content-aware fill, image healing, image restoration, or image editing; and
    outputting, by the at least one computing device, a result of the imaging process having the color values for the plurality of pixels within the region.

2. The method as described in claim 1, wherein each of the identified plurality of pixels outside of the region of the image borders the region of the image.

3. The method as described in claim 1, wherein the identified plurality of pixels includes the at least two said pixels disposed at the opposing direction, one to another, and another two said pixels disposed at another opposing direction, one to another, that is perpendicular to the opposing direction of the at least two pixels.

4. The method as described in claim 1, wherein the identified plurality of pixels includes four of the pixels from outside of the region that are closest to the pixel within the region for which the identifying is performed.

5. The method as described in claim 1, further comprising ascertaining a weighting for each of the identified plurality of pixels outside of the region and wherein the determining of the color estimate is based on least in part of the weighting.

6. The method as described in claim 5, wherein the ascertaining of the weighting is based at least in part on a respective distance between the pixel within the region and respective ones of the identified plurality of pixels outside of the region.

7. The method as described in claim 5, wherein:
the identified plurality of pixels includes the at least two said pixels disposed at the opposing direction, one to another, and another two said pixels disposed at another opposing direction, one to another, that is perpendicular to the opposing direction of the at least two pixels; and
the ascertaining of the weighting is based at least in part on a distance between the at least two said pixels disposed at the opposing and a distance between the other two said pixels disposed at the other opposing direction.

8. The method as described in claim 1, wherein the imaging process includes a patch match technique.

9. In a digital medium environment, a method implemented by at least one computing device, the method comprising:
generating, by the at least one computing device, a color estimate for a plurality of pixels within a region of an image, the generating including:
identifying a plurality of pixels of the image outside of the region of the image for each pixel of the plurality of pixels within the region, in which the identified plurality of pixels borders the region; and
determining the color estimate for each of the plurality of pixels within the region based at least in part on the identified plurality of pixels outside of the region;
initializing, by the at least one computing device, an imaging process to compute color values for the plurality of pixels within the region using the color estimate for each of the plurality of pixels within the region, wherein the imaging process is configured to perform at least one of hole filling, content-aware fill, image healing, image restoration, or image editing; and
outputting, by the at least one computing device, a result of the imaging process having the color values for the plurality of pixels within the region.

10. The method as described in claim 9, wherein the identified plurality of pixels includes the at least two said pixels disposed at the opposing direction, one to another, and another two said pixels disposed at another opposing direction, one to another, that is perpendicular to the opposing direction of the at least two pixels.

11. The method as described in claim 9, further comprising ascertaining a weighting for each of the identified plurality of pixels outside of the region and wherein the determining of the color estimate is based on least in part of the weighting.

12. The method as described in claim 11, wherein the ascertaining of the weighting is based at least in part on a respective distance between the pixel within the region and respective ones of the identified plurality of pixels outside of the region.

13. The method as described in claim 11, wherein:
the identified plurality of pixels includes the at least two said pixels disposed at the opposing direction, one to another, and another two said pixels disposed at another opposing direction, one to another, that is perpendicular to the opposing direction of the at least two pixels; and
the ascertaining of the weighting is based at least in part on a distance between the at least two said pixels disposed at the opposing and a distance between the other two said pixels disposed at the other opposing direction.

14. In a digital medium environment, an image processing system comprising:
an initialization module implemented at least partially in hardware of a computing device to generate a color estimate for a plurality of pixels within a region of an image, the generation of the color estimate including:
identification of a plurality of pixels of the image outside of the region of the image for each pixel of the plurality of pixels within the region, in which at least two of the identified plurality of pixels are identified based on disposition at opposing directions, one to another, from the pixel within the region and as bordering the region; and
determination of the color estimate for each of the plurality of pixels within the region based at least in part on the identified plurality of pixels outside of the region; and
an imaging process module implemented at least partially in hardware of the computing device to:
initialize an imaging process to compute color values for the plurality of pixels within the region starting with the color estimate for each of the plurality of pixels within the region, wherein the imaging process is configured to perform at least one of hole filling, content-aware fill, image healing, image restoration, or image editing; and
output a result of the imaging process having the color values for the plurality of pixels within the image.

15. The system as described in claim 14, wherein the identified plurality of pixels includes the at least two said pixels disposed at the opposing direction, one to another, and another two said pixels disposed at another opposing direction, one to another, that is perpendicular to the opposing direction of the at least two pixels.

16. The system as described in claim 14, wherein the initialization module is further configured to ascertain a weighting for each of the identified plurality of pixels outside of the region and wherein the determining of the color estimate is based on least in part of the weighting.

17. The system as described in claim 16, wherein the weighting is based at least in part on a respective distance between the pixel within the region and respective ones of the identified plurality of pixels outside of the region.

18. The system as described in claim 16, wherein:
the identified plurality of pixels includes the at least two said pixels disposed at the opposing direction, one to another, and another two said pixels disposed at another opposing direction, one to another, that is perpendicular to the opposing direction of the at least two pixels; and
the weighting is based at least in part on a distance between the at least two said pixels disposed at the opposing and a distance between the other two said pixels disposed at the other opposing direction.

* * * * *